(12) United States Patent
Tsunematsu

(10) Patent No.: US 8,675,256 B2
(45) Date of Patent: Mar. 18, 2014

(54) IMAGE PROCESSING APPARATUS, IMAGE PROCESSING METHOD, AND STORAGE MEDIUM

(75) Inventor: Yuuichi Tsunematsu, Kowloon (HK)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/933,368

(22) PCT Filed: Jun. 29, 2010

(86) PCT No.: PCT/JP2010/004295
§ 371 (c)(1),
(2), (4) Date: Sep. 17, 2010

(87) PCT Pub. No.: WO2011/001669
PCT Pub. Date: Jan. 6, 2011

(65) Prior Publication Data
US 2011/0128586 A1 Jun. 2, 2011

(30) Foreign Application Priority Data

Jul. 1, 2009 (JP) ................................. 2009-156972

(51) Int. Cl.
*G06K 15/00* (2006.01)
*H04N 1/40* (2006.01)
*H04N 1/60* (2006.01)

(52) U.S. Cl.
USPC ........... 358/2.1; 358/1.9; 358/1.13; 358/1.15; 358/540

(58) Field of Classification Search
USPC .................. 358/2.1, 3.01, 515, 521, 1.1–1.9; 382/165, 180, 225
See application file for complete search history.

(56) References Cited

U.S. PATENT DOCUMENTS

| 6,701,010 B1 * | 3/2004 | Katsuyama ................... 382/165 |
| 6,771,813 B1 | 8/2004 | Katsuyama |
| 6,990,235 B2 | 1/2006 | Katsuyama |
| 7,298,900 B2 | 11/2007 | Kanatsu |

(Continued)

FOREIGN PATENT DOCUMENTS

| EP | 1-385-329 A2 | 1/2004 |
| EP | 1-564-684 A2 | 8/2005 |

(Continued)

OTHER PUBLICATIONS

"Guide to Image Processing Using C Language", first edition, Nov. 20, 2000, Shokodo Co., Ltd, pp. 106-115 (Partial Translation).

(Continued)

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

The cluster of a background is specified among a plurality of clusters classified by clustering processing, and a label area whose size is less than a first threshold value is combined with adjoining another label area which is not the cluster of the background among label areas to which the same label number is given by labeling processing. Then, whether the label area is combined with the adjoining another label area based on characteristic quantity obtained from the label area is determined, and combining, vector data is generated based on the label area after combining the label area when determined as the label area being combined.

12 Claims, 9 Drawing Sheets

(56) References Cited

U.S. PATENT DOCUMENTS

| | | |
|---|---|---|
| 7,623,712 B2 | 11/2009 | Dai et al. |
| 7,764,834 B2 | 7/2010 | Simard, III et al. |
| 2005/0271281 A1* | 12/2005 | Simard et al. ............ 382/225 |
| 2007/0025617 A1* | 2/2007 | Dai et al. ................ 382/180 |
| 2007/0229866 A1 | 10/2007 | Dai et al. |
| 2007/0286478 A1 | 12/2007 | Kishi |
| 2008/0137961 A1 | 6/2008 | Ishida et al. |
| 2008/0170787 A1 | 7/2008 | Cheng et al. |
| 2008/0219553 A1 | 9/2008 | Akiyama |
| 2010/0231995 A1 | 9/2010 | Tsunematsu |

FOREIGN PATENT DOCUMENTS

| | | |
|---|---|---|
| JP | 6-103371 | 4/1994 |
| JP | 11-288465 | 10/1999 |
| JP | 2001-283153 A | 10/2001 |
| JP | 2003-323617 A | 11/2003 |
| JP | 2004-126648 | 4/2004 |
| JP | 2006-344069 | 12/2006 |
| JP | 2007-089136 | 4/2007 |
| JP | 2007-272456 | 10/2007 |
| JP | 2008-022529 | 1/2008 |
| JP | 2008-146496 | 6/2008 |

OTHER PUBLICATIONS

European Search Report dated Jul. 17, 2013 in EP 10793842.5.
Office Action issued in counterpart Chinese Appln. No. 201080029816.7, dated Apr. 1, 2013.
International Preliminary Report on Patentability dated Jan. 12, 2012 in corresponding PCT Application No. PCT/JP2010/004295.

* cited by examiner

| LABEL NUMBER | CLUSTER NUMBER | CLUSTER COLOR (RGB) |
|---|---|---|
| 1 | A | (255,255,255) |
| 2 | B | (0,0,0) |
| 3 | C | (127,127,127) |
| 4 | D | (38,38,38) |
| 5 | E | (72,72,72) |
| 6 | C | (127,127,127) |
| 7 | B | (0,0,0) |
| 8 | B | (0,0,0) |
| 9 | C | (127,127,127) |
| 10 | A | (255,255,255) |

FIG.4

| LABEL NUMBER | CLUSTER NUMBER | CLUSTER COLOR (RGB) | PIXEL AREA | CLUSTER SHAPE |
|---|---|---|---|---|
| 1 | A | (255,255,255) | 300 | |
| 2 | B | (0,0,0) | 24 | |
| 3 | C | (127,127,127) | 3 | MICRO SIZE |
| 4 | D | (38,38,38) | 1 | MICRO SIZE |
| 5 | E | (72,72,72) | 2 | MICRO SIZE |
| 6 | C | (127,127,127) | 1 | MICRO SIZE |
| 7 | B | (0,0,0) | 42 | LINE PROFILE |
| 8 | B | (0,0,0) | 125 | |
| 9 | C | (127,127,127) | 13 | LINE PROFILE |
| 10 | A | (255,255,255) | 73 | LINE PROFILE |

FIG.6

| LABEL NUMBER | CLUSTER NUMBER | CLUSTER COLOR (RGB) | PIXEL AREA | CLUSTER SHAPE |
|---|---|---|---|---|
| 1 | A | (255,255,255) | 300 | |
| 2 | B | (0,0,0) | 24 | |
| 3 | C | (127,127,127) | 6 | |
| 7 | B | (0,0,0) | 42 | LINE PROFILE |
| 8 | B | (0,0,0) | 125 | |
| 9 | C | (127,127,127) | 13 | LINE PROFILE |
| 10 | A | (255,255,255) | 73 | LINE PROFILE |

FIG.9

IMAGE PROCESSING APPARATUS, IMAGE PROCESSING METHOD, AND STORAGE MEDIUM

TECHNICAL FIELD

The present invention relates to a method, an apparatus, and a storage medium for an image processing to effectively remove scanning noise included in an image (e.g. an illustration image) composed of uniform color areas in order to suit a vectorization processing by combining the scanning noise in the unit of a label after performing a labeling processing.

BACKGROUND ART

In recent years, a system for not storing a paper document in that condition, but storing the paper document as electronic data after reading the paper document by a scanner etc., or transmitting the electronic data to other apparatus has spread, as the computerization of information advances. In order to reduce a transmitting cost of electronic data, a high compression ratio is required for the electronic document. On the other hand, the reusability allowing objects in the electronic data to be partially edited and the high-quality picture performance in which image quality does not deteriorate even when the electronic data is scaled are required for user's convenience.

In order to vectorize the scan image, although it is necessary to reduce scanning noise included in an input image and to extract an outline of original image, a color reduction processing is needed as the pre-processing. For example, it has been chosen as a method of performing more exact color separation by combining clusters of similar colors in the post-processing after extracting the number of colors to some extent by clustering at first.

For example, Patent Literature 1 discloses a method of deleting a cluster with size smaller than a predetermined threshold value for the result of having clustered to a scan image.

CITATION LIST

Patent Literature

[PTL 1] Japanese Patent Laid-Open No. 2006-344069
[PTL 2] Japanese Patent Laid-Open No. 2004-126648
[PTL 3] Japanese Patent Laid-Open No. 2008-146496

Non Patent Literature

[NPL 1] Agui and Nagao. ed. "Guide to Image Processing by C Language", first edition, ISBN4-7856-3124-4, Shokodo Co., Ltd., issued on Nov. 20, 2000, p. 106 to 115.

SUMMARY OF INVENTION

According to above-mentioned Patent Literature 1, since only the size is referred, a cluster with larger size than a threshold value remains without combining. Specifically, each of over-divided cluster data caused by scanning noise possesses a certain amount of size, so that the process for the cluster data could not be performed well.

An image processing apparatus according to the present invention includes: a clustering component configured to classify an image into a plurality of clusters based on a color of each pixel included in the image; a background cluster specifying component configured to specify a cluster of a background among the plurality of clusters classified by the clustering component; a labeling component configured to give a same label number for every linked pixel group classified into a same cluster by the clustering component; a first combining component configured to combine a label area whose size is less than a first threshold value among the label areas where the same label number is given by the labeling component, with adjoining another label area which is not the cluster of the background; a second combining component configured to determine whether the label area is combined with adjoining another label area based on characteristic quantity obtained from the label area after executing the combining processing by the first combining component, and to combine the label area when determined as the label area being combined; and a generating component configured to generate vector data based on the label area after executing the combining processing by the second combining component.

According to the present invention, a noise component occurred by clustering a scan image can be removed with more sufficient accuracy without a broken line occurring.

Further features of the present invention will become apparent from the following description of exemplary embodiments (with reference to the attached drawings).

BRIEF DESCRIPTION OF DRAWINGS

FIG. 4 is a diagram showing a conversion table of the clustering result and the labeling result;

FIG. 6 is a diagram showing a conversion table which has shape information of labels;

FIG. 9 is a diagram showing a conversion table after combining the micro-sized labels.

DESCRIPTION OF EMBODIMENTS

Example 1

Figure 1:
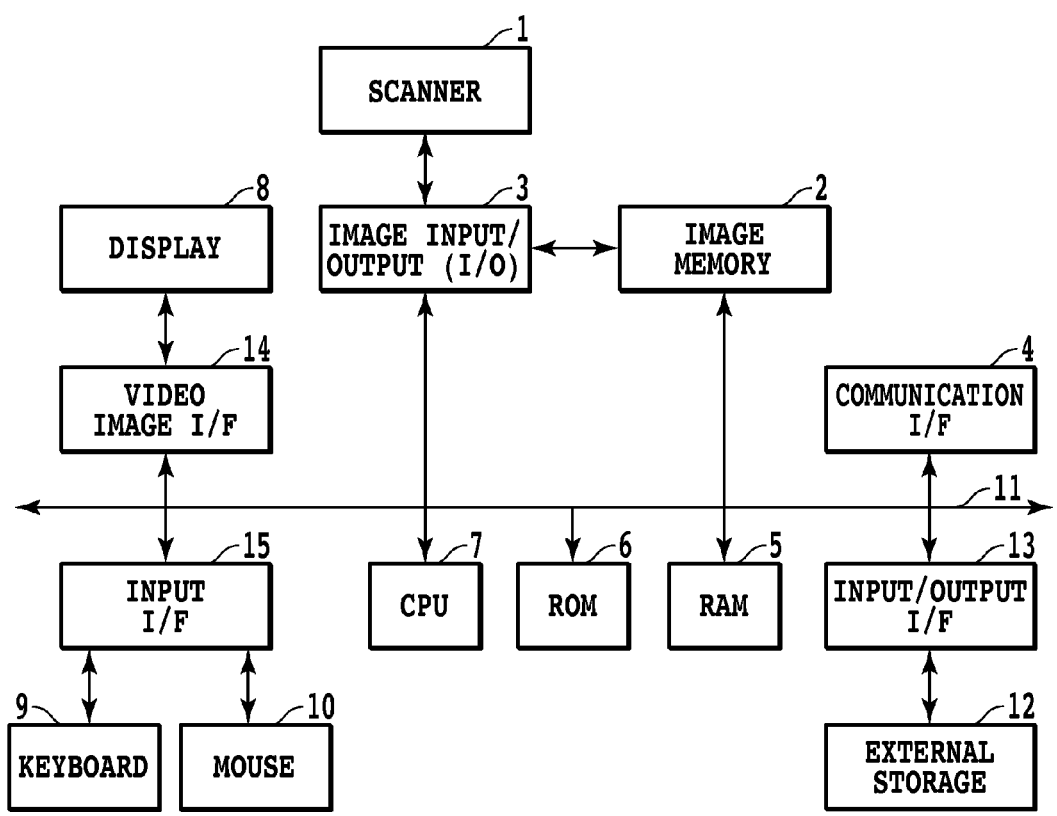
FIG. 1 is a block configuration diagram of an image processing apparatus according to an embodiment of the present invention.

A configuration example of an image processing apparatus according to this embodiment will be explained with reference to a block diagram shown in FIG. 1.

A Central Processing Unit (CPU) 7 controls this whole apparatus. A Read Only Memory (ROM) 6 stores a program (s) and parameter(s) which do not need change. A Random Access Memory (RAM) 5 stores temporarily a program(s) and data provided from an external apparatus etc. A scanner 1 scans a document etc. in photoelectricity and obtains electronic image data. An image input/output (I/O) 3 connects this apparatus with the scanner 1. An image memory 2 holds the image data etc. read by the scanner 1. An external storage 12 is a storage device through the medium of a hard disk and a memory card that are fixedly installed, and/or the removable medium of a flexible disk (FD), an optical disc such as a Compact Disk (CD), a magnetic card, an optical card, a IC card, a memory card, etc.

An input/output interface 13 is an interface between the external storage 12 and this apparatus. An input interface 15 is an interface with an input device of a pointing device 10 such as a mouse, or a keyboard 9 etc. for accepting an operation and inputs data from user. A video output interface 14 is an interface with the display monitor 8 for displaying data held by this apparatus and data provided to this apparatus. A communication interface 4 is a network interface for connecting with networks, such as the Internet. A system bus 11 connects each unit 1-15 so that communication is possible.

Hereinafter, a procedure for achieving the present invention by a program loaded to the RAM 5 from the external storage 12 and executed on the CPU will be explained with reference to a flow chart shown in FIG. 2.

With the start of the process, the image data including an image area of a processing object is input at Step S100. Regarding the input of image data, the image data read by the scanner 1 is input into the image memory 2 via the image input/output (I/0) 3. Alternatively, an image including an image area which is a processing object via the communication I/F 4 may be input from the outside of the apparatus, and/or image data stored in the external storage 12 beforehand may also be read out via the input/output I/F 13. The obtained image data is held on the image memory 2.

At Step S200, area division is executed to extract a graphics area including an illustration from the input image data. Although there are some methods for performing the area division, it can divide into partial areas having a different property, such as a character, a diagram, a photograph, and a table, also taking a reversed character into consideration, by applying the method disclosed in Patent Literature 2, for example.

In a color area division processing (S301 and S302) of Step S300, a color separate image corresponding to the extracted graphics area is generated. First of all, at Step S301, clustering processing is executed for the image in the graphics area, the same cluster number is added for a pixel determined to be the same color, and an index image using the cluster number is created. At this time, colors whose distances are similar in a predetermined threshold range are determined to be the same colors, and the same colors are classified into the same cluster (the same color area). Accordingly, the number of colors which was tens of thousands in a stage immediately after scanning can be reduced from several colors to tens of colors, for example.

Although there are some clustering methods, the well-known Nearest Neighbor (NN) method can be used, for example (Non Patent Literature 1). In the NN method, when clustering Pn from the input P1, a cluster C1 which applies P1 as a representative pattern is created firstly. Next, aiming at Pi (where i>=2), the distance from Cj (where j is a cluster number) is compared. When the distance is less than a threshold value defined beforehand, Pi is made to belong to a cluster of shortest distance. When a cluster in the distance of less than the threshold value is not found, a new cluster is created. The clustering processing is achieved by executing the above-mentioned process for all the inputs P.

When applying the above-mentioned method as color reduction processing, what is necessary may be to apply the input to pixel values (an RGB value or a luminance value, etc), and to apply the distance into color distances, such as Manhattan distance (city-block distance) and Euclidean distance. In this case, if the threshold value of color distance is made small, it is in the tendency for the number of clusters (the number of colors) after processing to increase and for the color reduction effect to fade.

At Step S302, a cluster number which composes a background area is specified from the clustering result, following the above-mentioned clustering processing. Vector data which passed through the background area can be generated by removing a background cluster from the target of vectorization processing and not outputting the vector data of the part of the removed cluster. A background cluster number can be determined uniquely by selecting for example, a cluster number whose proportion in the outermost periphery of the processing area is highest.

Although the scanning noise decreases from tens of thousands of colors to several colors or tens of colors by the above-mentioned color area division processing, there are still fairly large number of colors and the scanning noise is not removed enough to apply vectorization processing. Because the scanning noise (e.g. false colors resulting from the scan) remains, the data size is large for executing the vectorization processing in that condition, so that the editability degrades. Thus, in order to create a color separate image which is suitable for the vectorization processing by combining noise areas, at Step S400, a noise combination processing (noise combination for vectorization (S410-S470)) suitable for the vectorization is executed.

Figure 3:
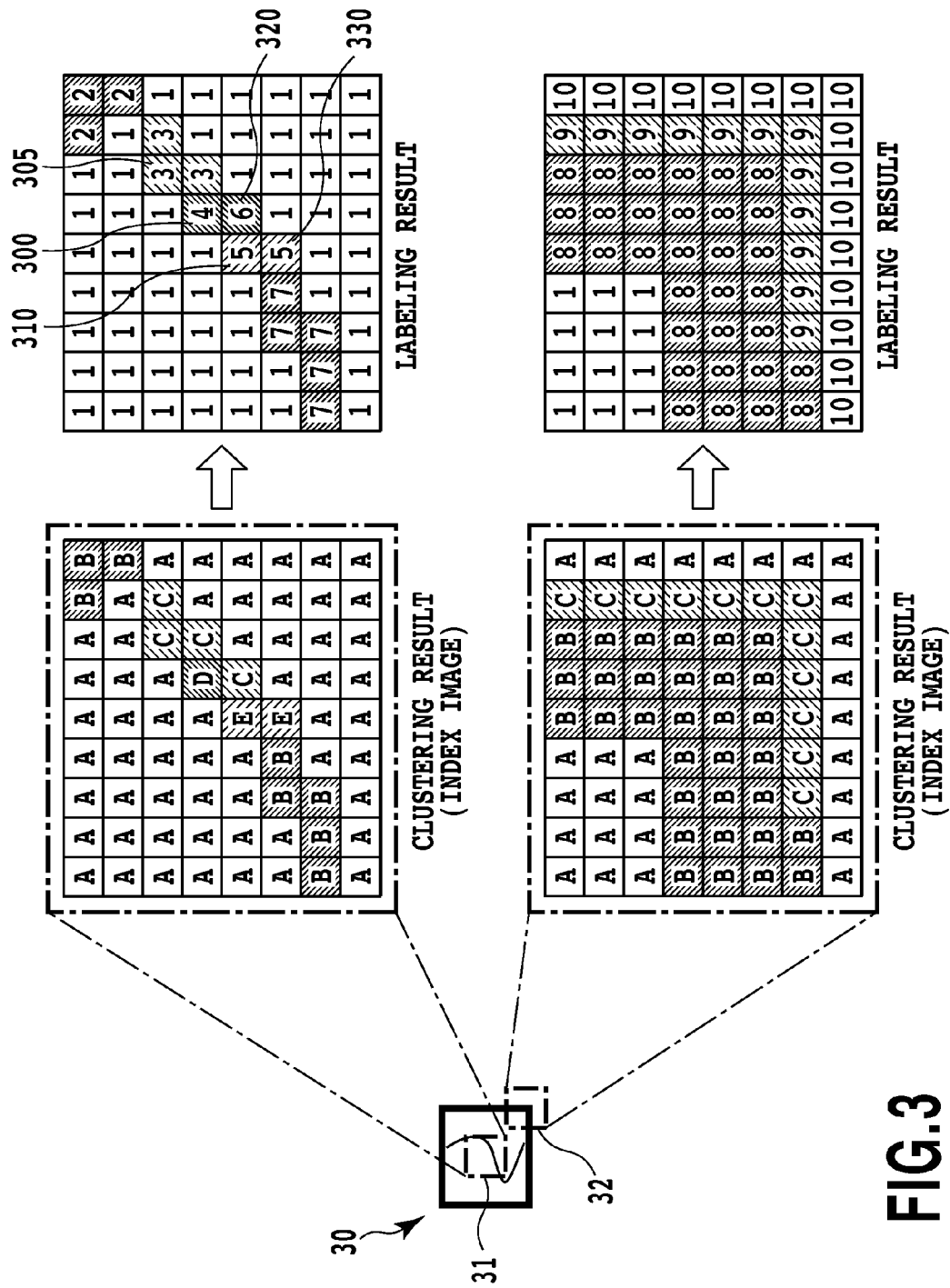
FIG. 3 is a diagram showing a clustering result and a labeling result for the clustering result.

First of all at Step S410, a labeling processing is executed for the image (index image) of the clustering processing result created at Step S300. The labeling processing is a processing for giving the same number to linked pixel groups having the same value, and is well used as pre-processing for obtaining information on each area (size, shape). FIG. 3 shows an example of an index image whose clustering result is replaced by the number and a result obtained by executing the labeling processing for the aforesaid index image. That is, in the clustering result of FIG. 3, the same cluster number (A-E) is given for every pixel determined as the same color. Moreover, in the labeling result of FIG. 3, the same label number (1-10) is given to every pixel group classified into the same cluster number and linked in any one of the vertical, horizontal, and diagonal direction (that is, label area composed of pixels having same color and linked). However, FIG. 3 shows enlarged parts 31 and 32 of input image 30, and it is presupposed that the clusters of the alphabet B are linked also out of the range of the diagram.

Moreover, a conversion table as shown in FIG. 4 for associating the labeling result with the cluster number is required to be prepared for its use at executing the labeling processing.

At Step S420, in order to detect an area unsuitable for the vectorization, an analysis processing for the shape of label area (the shape of area where the same label number is given) is executed, following the above-mentioned labeling processing. Specifically, in the analysis processing for the shape of label area, the apparatus executes a processing to determine the characteristic of the shape of label area such as the size of each label area and whether the shape of the label area is line profile. A label unsuitable for the vectorization such as a label area whose size is very small, and a label area of line profile, mainly occurs by the influence of scanning noise, as a result of the clustering processing. These areas invite the increase in data amount, and the degradation of the editability. Therefore, even if these areas are determined to be a different color area as the result of the clustering processing, it determines whether the area is able to combine with other label areas, and the area which can be combined is combined to be made a processing unit suitable for the vectorization.

By preparing a summary sheet with the label number and the size of the label corresponding to the number, the size of the label area can be obtained by one raster scanning for the whole image. By comparing the number of pixels of each label area with the first threshold value after the raster scan, it can be determined whether the aimed label area is micro size. Supposing that the resolution of the input scan image is 300 dpi, the confirmation is visually difficult for the label area less than 5 pixels, and therefore it is rare that visual degradation occurs even when combined with other areas. Accordingly, in processes hereafter, the first threshold value is set to 5, and the label area of the pixel number which is less than 5 pixels is determined as micro size. An alternative value may be used for the first threshold value corresponding to the input resolution or input image size. For example, it is more effective to use a larger value, since the upper limit of the number of pixels for which visual degradation cannot be detected becomes larger when the input resolution and input image size are large.

Figure 5:
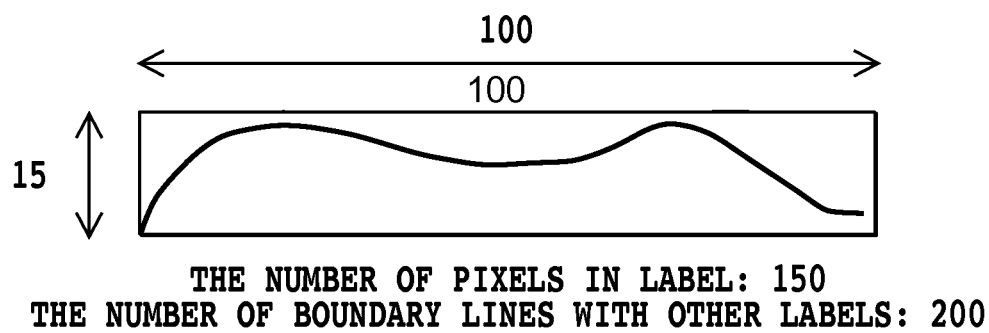
FIG. 5 is a diagram showing a label of the target for determining a line profile and an example of the extraction information.

Hereinafter, referring to a label shown in FIG. 5 as an example, a determining method of whether the label area is a line profile will be explained. As for the circumscribed rectangle size of this label area, the lateral width is 100 pixels, longitudinal width is 15 pixels, the number of pixels is 150, and the number of pixels (the length of a boundary line) located in the boundary between a black label area and a white label area is 200.

An aspect ratio of circumscribed rectangle is used for a first method. The ratio between the length of the longer side and the shorter side is calculated. If the calculated aspect ratio is a value larger than a predetermined aspect ratio threshold value, since the circumscribed rectangle is long and slender shape, it is determined that the label area is a line profile. If the aspect ratio threshold value is set to 5, since a larger aspect ratio than the threshold value 5 is obtained by the following formula in the case of the label area shown in FIG. 5, it can be determined that it is the label area of a line profile.

100(longer side length of circumscribed rectangle)/15
(shorter side length of circumscribed rectangle)
=6.67

The ratio between the size of the circumscribed rectangle and the number of pixels of the label area is used for a second method. The ratio between the size of the circumscribed rectangle and the size of an actual label area is calculated. If the calculated area ratio is not more than a predetermined circumscribed rectangle threshold value, since there is little size of the label area occupied among the circumscribed rectangle, it can be determined as the label area of a line profile. If the circumscribed rectangle threshold value is set to 7, since a larger ratio than the threshold value 7 is calculated by the following formula in the case of the label area shown in FIG. 5, it is determined as the label area of a line profile.

100×15(size of circumscribed rectangle)/150(size of
label area)=10

The ratio between the number of the pixels located in the boundary of labels (the length of a boundary line) and the size of the label area is used for a third method. The ratio between the length of a boundary line contacted with the label area and the size of the label area is calculated, and since the boundary line is long if the calculated ratio is more than a predetermined boundary threshold value, it is determined that the aimed label area is a line profile. If the boundary threshold value is set to 1.0, since the ratio larger than the threshold value 1.0 is calculated by the following formula in the case of the label area shown in FIG. 5, it can be determined as the label area of a line profile.

200(the number of boundary lines between other label
areas)/150(the number of the pixels of label area)
=1.33

FIG. 6 shows an example of adding the shape information of each label examined by combining the determining method of the above label shape to the conversion table of FIG. 4.

At Step S430 following the analysis processing of the above-mentioned label shape, the label area determined as micro size at Step S420 is preferentially combined with the adjoining label area without the background cluster number. When the micro-sized label area is a pixel group that composes a part of line and is crowded therewith, the line may break off if the aforementioned label area is incorrectly combined with the background label area. Accordingly, the line is prevented from breaking off by combining the micro-sized label area with other label areas except a background beforehand. Although it is also possible that the micro-sized label area occurred in the scanning noise becomes an isolated point among the background image, since the micro-sized label area can be combined with the label area having the background cluster number by processing hereafter, it does not become a problem.

At Step S440 following the above-mentioned micro label combining processing, a combining source label is selected. Raster scanning is executed toward the lower right from upper left of the image, the combining source label is selected one after another, and thereby it is confirmed whether a different label area is adjoining to the rightward and downward. If both rightward and downward have the same label numbers, the next pixel is chosen as the point aimed. If at least one of rightward and downward labels is adjoining the different label, such different label is selected as a combining destination label at Step S450.

Figure 7:
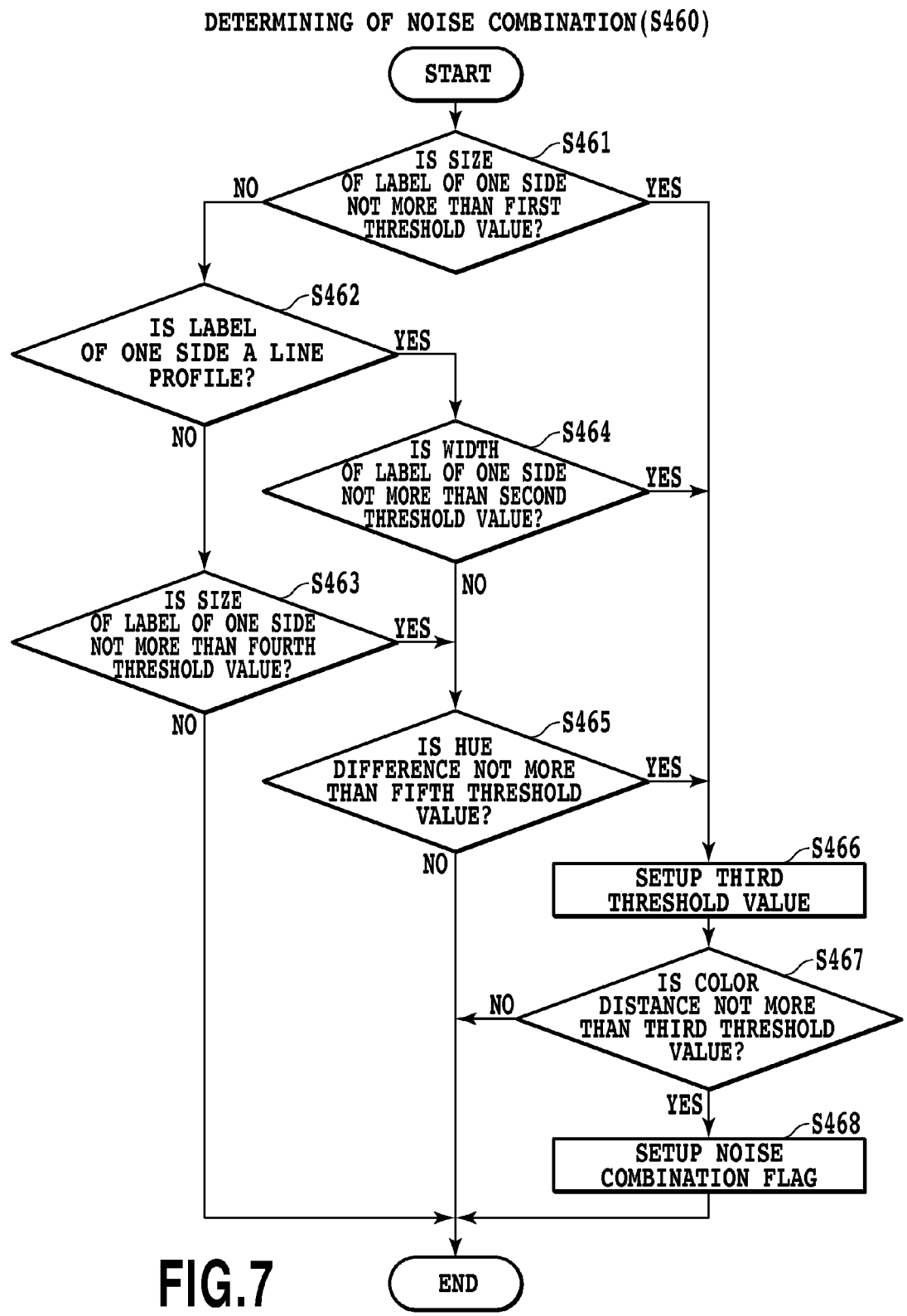
FIG. 7 is a flow chart showing a noise combination determination processing in the main processing.

In Step S460, it is determined whether two label areas selected in Step S440 and S450 are combined according to the procedure of a noise combination determination processing shown in a flow chart of FIG. 7. As a determining standard, the hue difference and color distance of aforesaid two labels is used.

In the noise combination determination process shown in FIG. 7, it is determined, using the characteristic quantity (size, shape, hue, and color distance of label area) obtained from the label area and a plurality of threshold values, whether each label area is combined. First of all, at Step S461, it is determined whether the size of the label area of at least one side is not more than a first threshold value. As a result of the determination, if the size of the label area of at least one side is not more than the first threshold value (that is, it is micro size), the threshold value which is easy to combine is set up as a third threshold value at Step S466. Since it is considered that the label area remaining as micro-sized label at the present stage is the isolated point which occurs because of the scanning noise and which is surrounded by the background cluster in the perimeter, the scanning noise can be removed by setting up the threshold value at a low level. Therefore, when the size of the label area of at least one side is not more than the first threshold value at Step S461, the color distance between two label areas is compared with the third threshold value without considering hue difference at Step S467.

When the size of both label areas are larger than the first threshold value, this process goes to Step S462, and then it is confirmed whether the label area of at least one side is a line profile. When both label areas are not line profiles, this process goes to Step S463.

At Step S463, it is examined whether the size of label area of at least one side is not more than a fourth threshold value. This is for preventing the combination between large-sized label areas. When the size of both label areas is larger than the fourth threshold value, the noise combination determination processing is completed without executing the combining processing of the labels. When the size of at least one side is not more than the fourth threshold value, this process goes to Step S465.

By the way, when the label area of one side is a line profile in the determination at Step S462, this process goes to Step S464. At Step S464, it is determined whether the width of the label area of at least one side is not more than the second threshold value specified according to the kind of output vector format. If the vectorized data is displayed by a renderer when the width of the label area of at least one side is not more than the second threshold value, the aimed label area is not displayed in exact width and the deterioration of image quality may occur. Accordingly, when the label of at least one side is not more than the second threshold value, the hue difference confirmation at Step S465 is omitted, and then this process goes to Step S466. Then at Step S466, the aimed label area is made easy to be combined by setting the threshold value (the third threshold value) of the color distance for combining between the label areas at a low level. In addition, the second threshold value can also be determined corresponding to the size and/or resolution of the input image.

When using 1 or 2 as the second threshold value, detection can be made using the ratio between the number of pixels of the label area and the boundary line of the label area as described in Example 1. What is necessary is just to be able to detect the label whose label area width is 1 or 2, since the 2nd threshold value denotes a lower limit of the label area width. Such a label area has a characteristic that the boundary line of the label area exists in not less than the number of pixels of the label area, when the ratio between the number of pixels if the label area and the boundary line of the label area is calculated. Furthermore, when the second threshold value is more than 3, it obtains for the line width of each label by using the line width detection method proposed by this applicant, and thereby the obtained line width can be used for determining at Step S440.

In the case of an affirmation determination at Step S463 or the case of a negative determination at Step S464, the hue difference between two aimed label areas is examined at Step S465. The hue difference is obtained by changing the color space of the label area of the aimed pixel into HSV and referring to the value of H. When this hue difference is not more than the fifth threshold value, this process goes to Step S467 for determining the color distance. On the other hand, when the hue difference is larger than the fifth threshold value, the noise combination determination processing is completed without executing the combining processing of the label. Moreover, at step S466, when both label areas are the colors near black by referring to the value of H, the third threshold value used for the color distance determination executed at Step S467 can be set at a lower level. This is because the color distance of black image tends to appear distantly and the black image needs to set up a threshold value at a low level for combining like other colors. Determination whether both label areas are close to black can be performed by examining whether the value of H of both label areas is not more than a sixth threshold value.

At Step S467, the color distance between two aimed label areas is examined. The Manhattan distance (city-block distance) and Euclidean distance of RGB can be used for the color distance. When this color distance is not more than the third threshold value, a noise combination flag is set up at Step S468. When this color distance is more than the third threshold value, the noise combination determination processing is completed without combining two labels.

Figure 2:
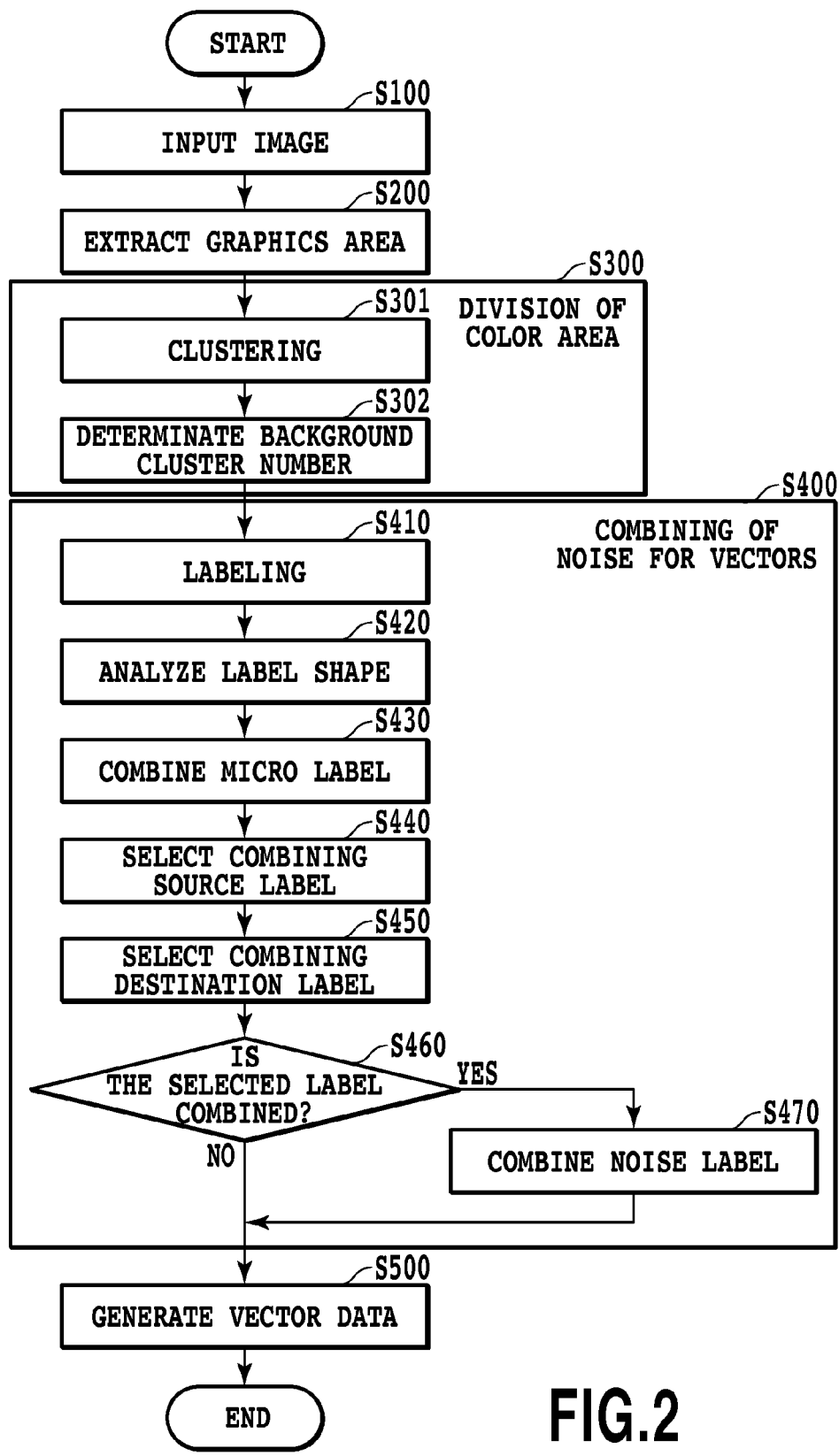
FIG. 2 is a flowchart showing a main processing executed in the image processing apparatus according to the embodiment of the present invention.

As a result of the above noise combination determination processing, when it is determined that the noise combination is performed, two selected label areas are combined at Step S470 of the flow chart shown in FIG. 2. In the combining processing, the label number with smaller size is rewritten with the label number with larger size, and the shape information regarding the label areas is updated.

Figure 8:
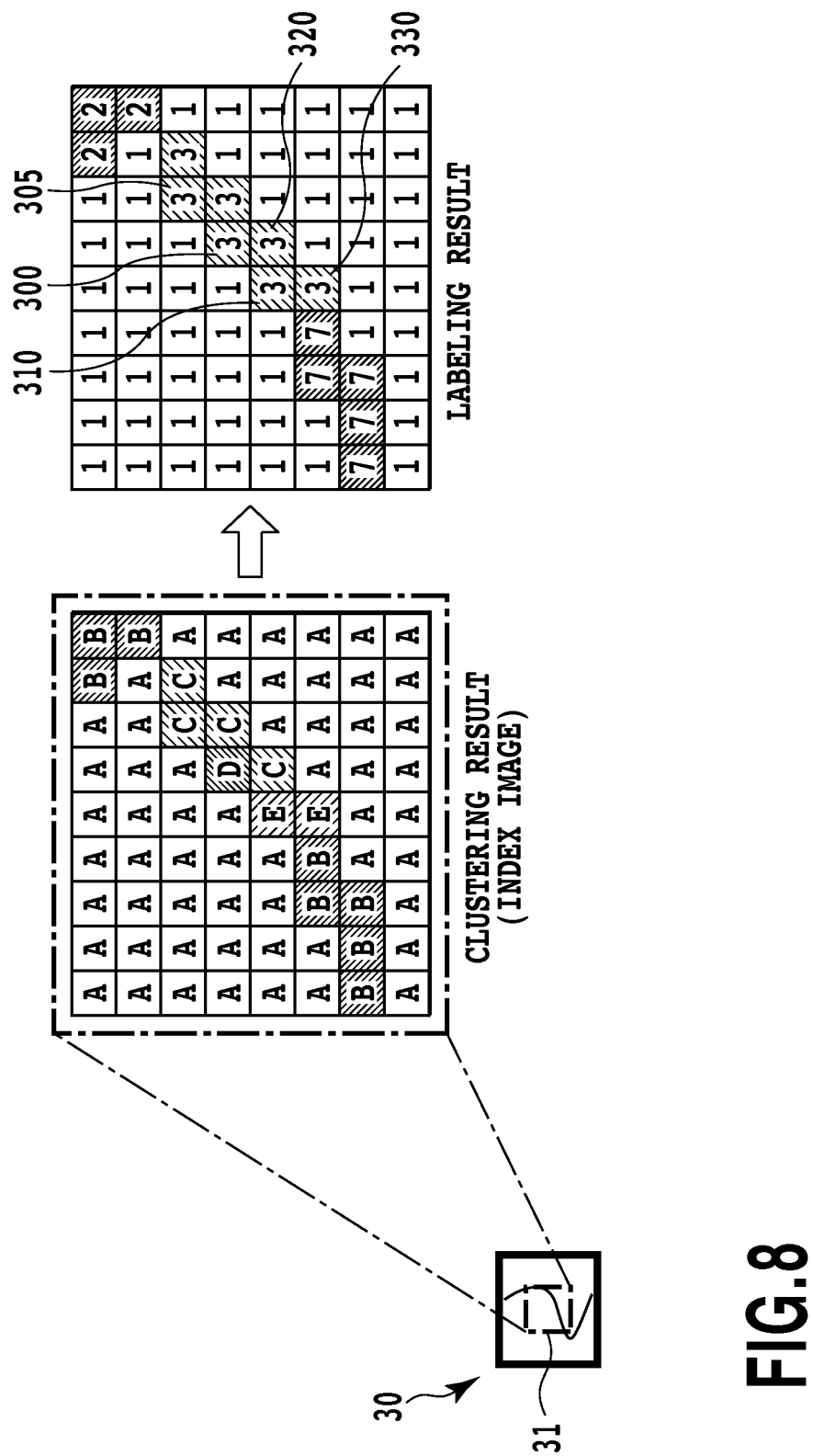
FIG. 8 is a diagram showing an example of a processing result obtained by combining micro-sized labels.

FIG. 8 shows a result of executing the above-mentioned combining processing for the labeling result of FIG. 3. As illustrated, firstly, in FIG. 3, the label area 300 of the label number 4 (micro size) is combined with the upper right label area 305 and is updated to the label number 3 (micro size). Next, in FIG. 3, the label area 310 of the label number 5 (micro size) is combined with the upper right updated label area 300 and is updated to the label number 3 (micro sized). Similarly, the label area 320 is combined with the upper updated label area 300. As a result, a conversion table after the combining processing of the clustering result and the labeling result is shown in FIG. 9.

When there is no necessity for the combining processing, and when the combining processing is completed, a conversion processing to vector data is executed by using the well-known vectorization method (for example, Patent Literature 3) in Step S500. The outline of the label area (image for every color) after the combining processing is extracted and the approximation of function of each outline is performed, thereby changing into vector data and outputting in accordance with an output format. In this case, the approximation of function of the outline of each label area may be performed individually and the result of the same approximation of function may be applied to the label which shares the boundary after dividing the outline for every boundary line.

Example 2

Example 1 discloses the example showing that combination is executed when the label area satisfying the conditions is found at first in the case where the combination destination of the label area is selected at Step S450 of the flow chart shown in FIG. 2. However, the scope of the present invention is not limited to this example. For example, it may confirm whether the area adjoining label areas can be combined about all the combination, and label areas with the nearest color distance may be combined. According to this method, although the processing time becomes longer as compared with the method described in Example 1, a more exact label area (color separate image) is generable.

Also, when the aimed label area is a line profile, the end point of the aimed label area suitably contacts other label area to be combined in many cases. Thus, the aimed label area maybe combined to the other label area having the nearest color distance among other label areas contacted to the end point of the aimed label area.

Example 3

Example 1 discloses the example showing combination of the micro-sized label area with the adjoining label area except the background cluster, at Step S430 of the flow chart shown in FIG. 2. However, the scope of the present invention is not limited to this example. The adjoining micro label areas may be combined in a bundle when the micro-sized label areas are adjoining at Step S430, and the combined label areas may be treated as one label area as a whole in processing hereafter. In this case, it can prevent the micro-sized label area being incorrectly combined with the label area having the background cluster number by the micro-sized label areas being combined, and therefore the problem that a line breaks off is not occurred.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a storage medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156972, filed Jul. 1, 2009, which is hereby incorporated by reference herein in its entirety.

The invention claimed is:

1. An image processing apparatus comprising:
a clustering component configured to classify an image into a plurality of clusters based on a color of each pixel included in the image, wherein a cluster number is given for each of the classified clusters;
a background cluster specifying component configured to specify a cluster of a background among the plurality of clusters classified by the clustering component;
a labeling component configured to obtain a plurality of label areas by giving each label area a label number for every linked pixel group classified into a same cluster by the clustering component, wherein each label number given by the labeling component is associated with one of the cluster numbers which is given to the corresponding one of the plurality of clusters;
a first combining component configured to combine a label area whose size is less than a first threshold value among the plurality of label areas obtained by the labeling component, with an adjoining another label area which is not associated with a cluster number which is given to the cluster of the background;
a second combining component configured to determine whether the label area combined by the first combining component is further combined with the adjoining another label area based on a characteristic quantity obtained from the label area combined by the first combining component, and to further combine the label area with the adjoining another label area when determined as the label area being further combined; and
a generating component configured to generate vector data based on the label area further combined by the second combining component.

2. The image processing apparatus according to claim 1, further comprising an area extraction component configured to extract a graphics area from the image, wherein the clustering component configured to classify an image in the graphics area extracted by the area extraction component as a processing object into the plurality of clusters based on a color of each pixel included in the image in the graphics area.

3. The image processing apparatus according to claim 1, wherein the second combining component determines whether the label area combined by the first combining component is further combined with an adjoining another label area based on at least one of a size, a shape, a hue, and a color distance of the label area as characteristic quantity obtained from the label area combined by the first combining component, and further combines the label area with adjoining another label area when determined as the label area being further combined.

4. The image processing apparatus according to claim 3, wherein
the second combining component, when it is determined that the size of the label area combined by the first combining component is less than the first threshold value, determines whether to combine the label area and the adjoining another label area based on information on whether a color distance between the label area and the adjoining another label area is not more than a third threshold value, and
further combines the label area with the adjoining another label area when determined as the label area being further combined.

5. The image processing apparatus according to claim 4, wherein
the second combining component, when determined that the size of the label area combined by the first combining component is not less than the first threshold value, determines whether the shape of the label area combined by the first combining component is a line profile,
further determines whether a width of the label area combined by the first combining component is not more than a second threshold value when determined as the shape of the label area combined by the first combining component being the line profile,
determines whether the label area and the adjoining another label area are combined based on information on whether a color distance between the label area and the adjoining another label area is not more than the third threshold value when determined as the width of the label area being not more than the second threshold value, and
further combines the label area with the adjoining another label area when determined as the label area being further combined.

6. The image processing apparatus according to claim 5, wherein
the second combining component, when determined that the shape of the label area combined by the first combining component is not the line profile, further determines whether the size of the label area combined by the first combining component is not more than a fourth threshold value,
does not combine the label areas combined by the first combining component when determined as the size of the label area being more than the fourth threshold value,
further determines whether a hue difference between the label area combined by the first combining component and the adjoining another label area is not more than a fifth threshold value when determined as the size of the label area combined by the first combining component being not more than the fourth threshold value, does not further combine the label areas combined by the first combining component when determined that the hue difference is not more than the fifth threshold value, determines whether the label area and the adjoining another label area are further combined based on information on whether a color distance between the label area and the adjoining another label area is not more than the third threshold value when determined as the hue difference being not more than the fifth threshold value, and further combines the label area combined by the first combining component and the adjoining another label area when determined as the label area being further combined.

7. The image processing apparatus according to claim 4, wherein the second combining component further combines the label area combined by the first combining component and the adjoining another label area determined first as the color distance to the label area being less than the third threshold value.

8. The image processing apparatus according to claim 4, wherein the second combining component further combines the label area and another label area whose color distance is nearest among the adjoining other label areas adjoining to the label area, the color distance from the adjoining another label areas to the label area being less than the third threshold value.

9. The image processing apparatus according to claim 4, wherein the second combining component combines preferentially a label area contacted at an end point of a label area of a line profile among the adjoining another label areas whose color distance to the label area being less than the third threshold value.

10. The image processing apparatus according to claim 1, wherein when there is adjoining another label area whose size is less than the first threshold value adjoining to a label area whose size is less than the first threshold value, the first combining component combines the label area and the adjoining another label area.

11. A method performed in an image processing apparatus, the method comprising the steps of:
   as a clustering step, classifying an image into a plurality of clusters based on a color of each pixel included in the image, wherein a cluster number is given for each of the classified clusters;
   as a background cluster specifying step, specifying a cluster of a background among the plurality of clusters classified at the clustering step;
   as a labeling step, obtaining a plurality of label areas by giving each label area a label number for every linked pixel group classified into a same cluster at the clustering step, wherein each label number given at the labeling step is associated with one of the cluster numbers which is given to the corresponding one of the plurality of clusters;
   as a first combining step, combining a label area whose size is less than a first threshold value among the plurality of label areas obtained at the labeling step with an adjoining another label area which is not associated with a cluster number which is given to the cluster of the background;
   as a second combining step, determining whether the label area combined at the first combining step is further combined with the adjoining another label area based on a characteristic quantity obtained from the label area combined at the first combining step, and further combining the label area with the adjoining another label area when determined as the label area being further combined; and
   generating vector data based on the label area further combined at the second combining step.

12. A non-transitory computer-readable storage medium having computer-executable instructions for performing a method performed in an image processing apparatus, the method comprising the steps of:
   as a clustering step, classifying an image into a plurality of clusters based on a color of each pixel included in the image, wherein a cluster number is given for each of the classified clusters;
   as a background cluster specifying step, specifying a cluster of a background among the plurality of clusters classified at the clustering step;
   as a labeling step, obtaining a plurality of label areas by giving each label area a label number for every linked pixel group classified into a same cluster at the clustering step, wherein each label number given at the labeling step is associated with one of the cluster numbers which is given to the corresponding one of the plurality of clusters;
   as a first combining step, combining a label area whose size is less than a first threshold value among the plurality of label areas obtained at the labeling step, with an adjoining another label area which is not associated with a cluster number which is given to the cluster of the background;
   as a second combining step, determining whether the label area combined at the first combining step is further combined with the adjoining another label area based on a characteristic quantity obtained from the label area combined at the first combining step, and further combining the label area with the adjoining another label area when determined as the label area being further combined; and
   generating vector data based on the label area further combined at the second combining step.

* * * * *